United States Patent [19]

Morishita et al.

[11] Patent Number: 4,785,612

[45] Date of Patent: Nov. 22, 1988

[54] WALK-BEHIND LAWN MOWER

[75] Inventors: Masahiro Morishita; Kiyotaka Mikome; Mitsuo Miyazaki, all of Iwata, Japan

[73] Assignee: Yamaha Hatsudoki Kabushiki Kaisha, Iwata, Japan

[21] Appl. No.: 77,617

[22] Filed: Jul. 24, 1987

[51] Int. Cl.⁴ ............................................. A01D 34/74
[52] U.S. Cl. ..................................... 56/17.2; 56/11.8; 56/320.2
[58] Field of Search ............... 56/10.7, 11.4, 11.8, 56/16.9, 17.1, 17.2, 17.5, 255, 320.1, 320.2, 202

[56] References Cited

U.S. PATENT DOCUMENTS

| | | | |
|---|---|---|---|
| 2,848,859 | 8/1958 | Abel | 56/17.2 |
| 3,972,160 | 8/1976 | Boswell | 56/17.2 |
| 4,006,580 | 2/1977 | Kalleicher | 56/17.2 |
| 4,212,141 | 7/1980 | Miyazawa | 56/11.8 |
| 4,220,344 | 9/1980 | Kappel | 280/43 |
| 4,321,784 | 3/1982 | Wood et al. | 280/43.13 |
| 4,433,530 | 2/1984 | Schaefer | 56/11.8 |
| 4,512,144 | 4/1985 | Soldavini | 56/202 |
| 4,554,780 | 11/1985 | Umeno et al. | 56/11.8 |
| 4,693,064 | 9/1987 | Katayama | 56/202 |

FOREIGN PATENT DOCUMENTS

| | | | |
|---|---|---|---|
| 230223 | 7/1960 | Australia | 56/17.2 |
| 2329220 | 2/1975 | Fed. Rep. of Germany | |
| 59-62738 | 6/1984 | Japan | |
| 60-31224 | 3/1985 | Japan | |
| 61-95225 | 6/1986 | Japan | |
| 1206705 | 9/1970 | United Kingdom | 56/11.8 |

Primary Examiner—John Weiss
Attorney, Agent, or Firm—Ernest A. Beutler

[57] ABSTRACT

Self-propelled walk-behind lawn mower having a rear discharge chute. The rear wheels of the lawn mower are driven by the engine through an axle which is fixed relative to the outer housing and which extends below the discharge chute so as to not interfere with the flow of grass clippings from the discharge chute. A transmission is provided for driving the rear wheels and is offset to one side of the discharge chute so as to be clear of the path of discharged grass. All four wheels of the mower are simultaneously adjustable and the driven rear wheels are adjustably by pivotal movement of a driving transmission that interconnects the wheels with the driven axle. In addition, a combing arrangement is provided on the outer housing for combing grass upwardly before it reaches the cutting blade.

12 Claims, 6 Drawing Sheets

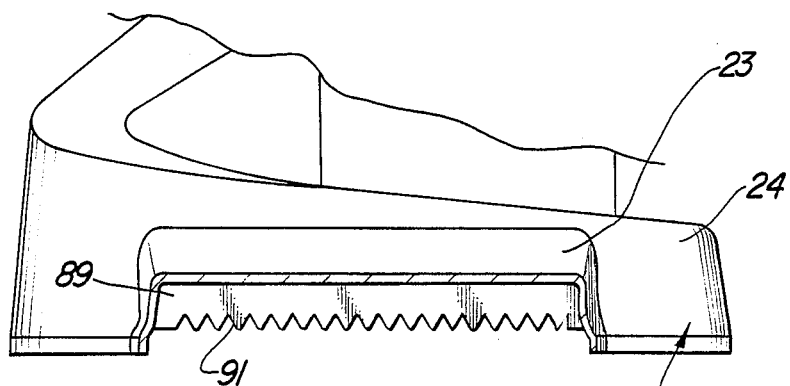
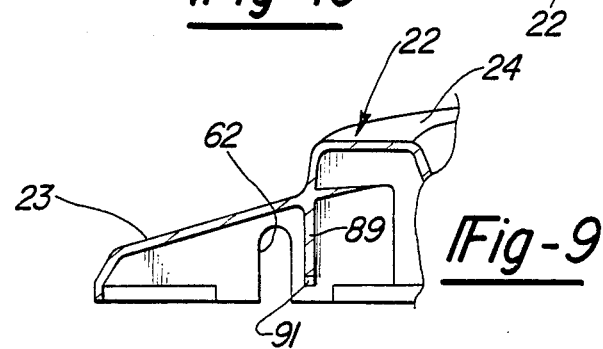
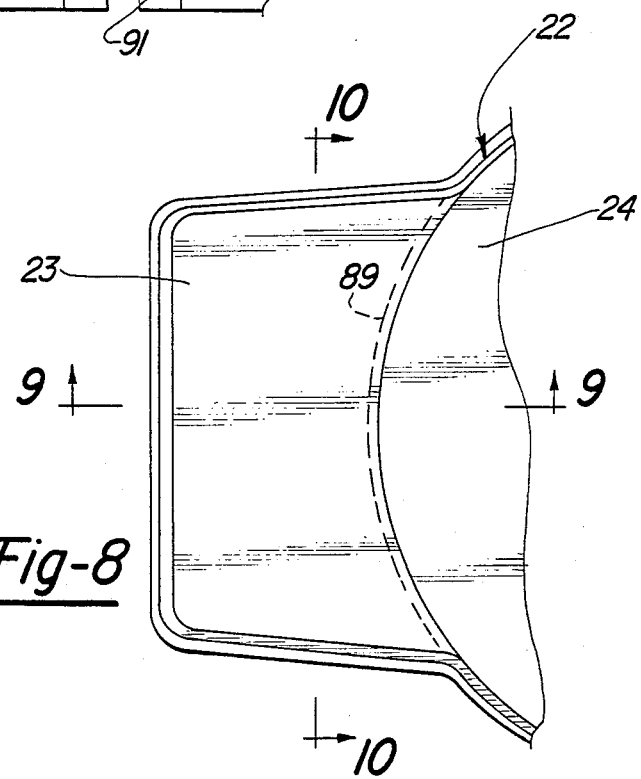

WALK-BEHIND LAWN MOWER

BACKGROUND OF THE INVENTION

This invention relates to a walk-behind lawn mower, and more particularly to an improved height adjusting, discharge chute and drive arrangement for such a lawn mower, as well as for an improved construction for providing a more uniform cut for such a lawn mower.

A common type of lawn mower is the so-called "rotary type". With this type of mower, the cutting blade rotates about a vertically disposed axis and is contained within a scroll-shaped outer housing that has an opening which forms a discharge chute through which the cut grass is discharged. This type of lawn mower may be either side or rear discharge type. A disadvantage with the side discharge type is that the catcher bag, which is attached to the side of the lawn mower, obstructs the ability of the mower to be placed close to objects such as trees, curbing or the like and thus substantially diminishes the utility of the mower.

Although a rear discharge type of mower overcomes these difficulties, there are certain other problems with the design of rear discharge rotary mowers. One of these has to do with the driving arrangement for the rear wheels, if the mower is of the self-propelled type. If both rear wheels are driven, the shaft for the rear wheels is positioned at a height such that it is in proximity to and extends across the discharge chute opening of the mower. As such, the flow of grass discharge is obstructed and, furthermore, grass may accumulate either on the axle shaft or on its outer housing to further clog the discharge opening. Furthermore, this location for the axle shaft tends to cause the grass clippings to impinge upon and become clogged in the drive arrangement for the axle.

It is, therefore, a principle object of this invention to provide an improved drive and chute arrangement for a self-propelled lawn mower.

It is a further object of this invention to provide an improved rear discharge, self-propelled rotary type of lawn mower.

It is another object of this invention to provide a driving arrangement for a rotary lawn mower when the driving arrangement will not interfere with the grass discharge and will not become contaminated by the grass that has been cut.

In connection with rotary type lawn mowers, they are normally provided with four independently adjustable wheels. Adjustment of the wheels relative to the mower housing accomplishes the cutting height adjustment. Although arrangements have been incorporated wherein more than one wheel may be adjusted simultaneously, when the mower is of the type having powered wheels, the manner of adjustment becomes very complicated. This is particularly true when pairs of wheels are coupled together through a driven axle and those wheels must have their height adjusted. The problem becomes even more acute when the adjustment is achieved in combination with the rear driven wheels of a rear discharge rotary motor.

It is, therefore, a still further object of this invention to provide an improved adjusting arrangement for the driven wheels of a lawn mower.

It is a further object of this invention to provide an improved wheel height adjustment for a rear discharge rotary lawn mower.

One of the disadvantages of certain types of rotary mowers is that they do not provide a uniform cut of the grass. The reason for this is that the motion of the blade is utilized to attempt to cause the grass to maintain an erect position so that it will be cut uniformly. However, with certain types of grasses or certain conditions, this construction, per se, is not sufficient so as to cause all of the grass to be held erect when being cut.

It is, therefore, a still further object of this invention to provide an improved cutting arrangement for a rotary type lawn mower that will insure that the grasses are erect before they are cut.

SUMMARY OF THE INVENTION

A first feature of the invention is adapted to be embodied in a rotary walk-behind lawn mower having an outer housing, a rotary cutting blade contained within the outer housing and rotatable about a generally vertical axis and a power unit that is carried by the outer housing for driving the cutter blade. The outer housing defines a discharge chute through which grass cut by the cutting blade is discharged. A plurality of wheels are journaled relative to the outer housing and an axle rotatably couples at least two of the wheels. The axle is journaled by the outer housing and extends across and beneath the discharge chute.

Another feature of this invention is also adapted to be embodied in a rotary walk-behind lawn mower having an outer housing, a rotating cutting blade and a power unit for driving the blade. The outer housing defines a discharge chute through which grass cut by the cutting blade is discharged and a plurality of wheels are journaled relative to the outer housing. An axle is journaled by the outer housing and means are provided for driving the axle from the engine. First and second transmission means are incorporated for driving first and second of the wheels from respective ends of the axle. The transmission means is pivotal about the axle for adjusting the height of the outer housing relative to the first and second wheels.

Yet another feature of the invention is adapted to be embodied in a walk-behind lawn mower having an outer housing, a rotating cutting blade and a power unit carried by the outer housing for driving the cutting blade for rotation about a generally vertically extending axis. The outer housing defines a discharge chute through which grass cut by the cutting blade is discharged. The mower is also provided with a plurality of wheels and an axle that is journaled by the outer housing. A transmission is provided for driving the axle from the engine and means are incorporated for driving at least one of the wheels from the axle. The transmission lies on one side of the discharge chute and is offset from the path of discharge of grass from the chute so that the cut grass will not impinge upon the transmission.

Yet another feature of the invention is adapted to be embodied in a rotary walk-behind lawn mower having an outer housing, rotating cutting blade and power unit for driving the rotating cutting blade for rotation about a vertically extending axis. The housing is mounted on a plurality of wheels. In accordance with this feature of the invention, the outer housing is formed with an inlet end that leads to the cutting blade and which is formed with a plurality of teeth for combing the grass upwardly before the grass reaches the cutting blade.

BRIEF DESCRIPTION OF THE DRAWINGS

FIG. 8 is an enlarged top plan view showing the front portion of the mower housing.

FIG. 9 is a cross-sectional view taken along the line 9—9 of FIG. 8.

FIG. 10 is a cross-sectional view taken along the line 10—10 of FIG. 8.

DETAILED DESCRIPTION OF THE PREFERRED EMBODIMENT OF THE INVENTION

Figure 1:
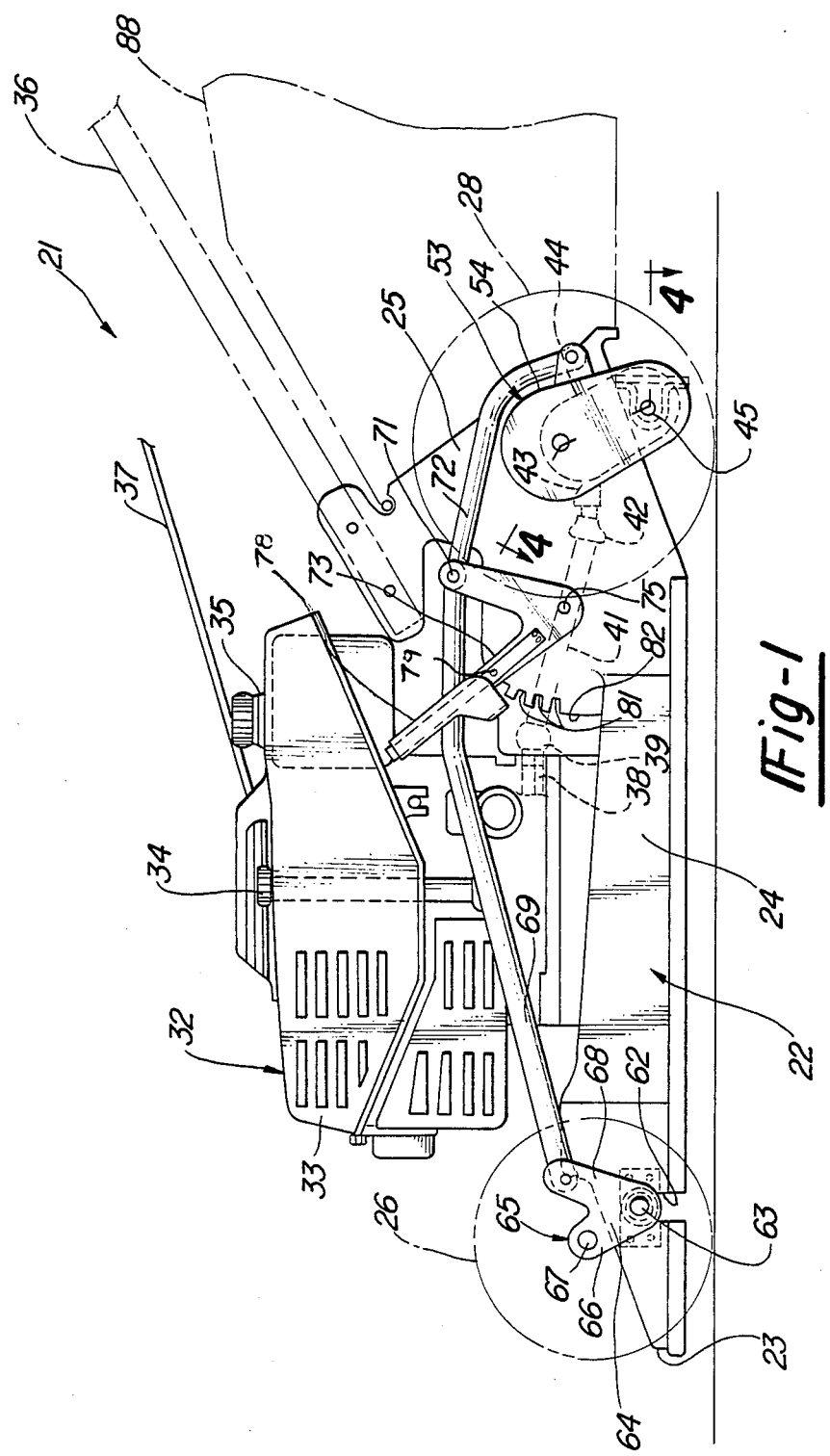
FIG. 1 is a side elevational view of a rotary walk-behind self-propelled lawn mower constructed in accordance with an embodiment of the invention.
Figure 2:
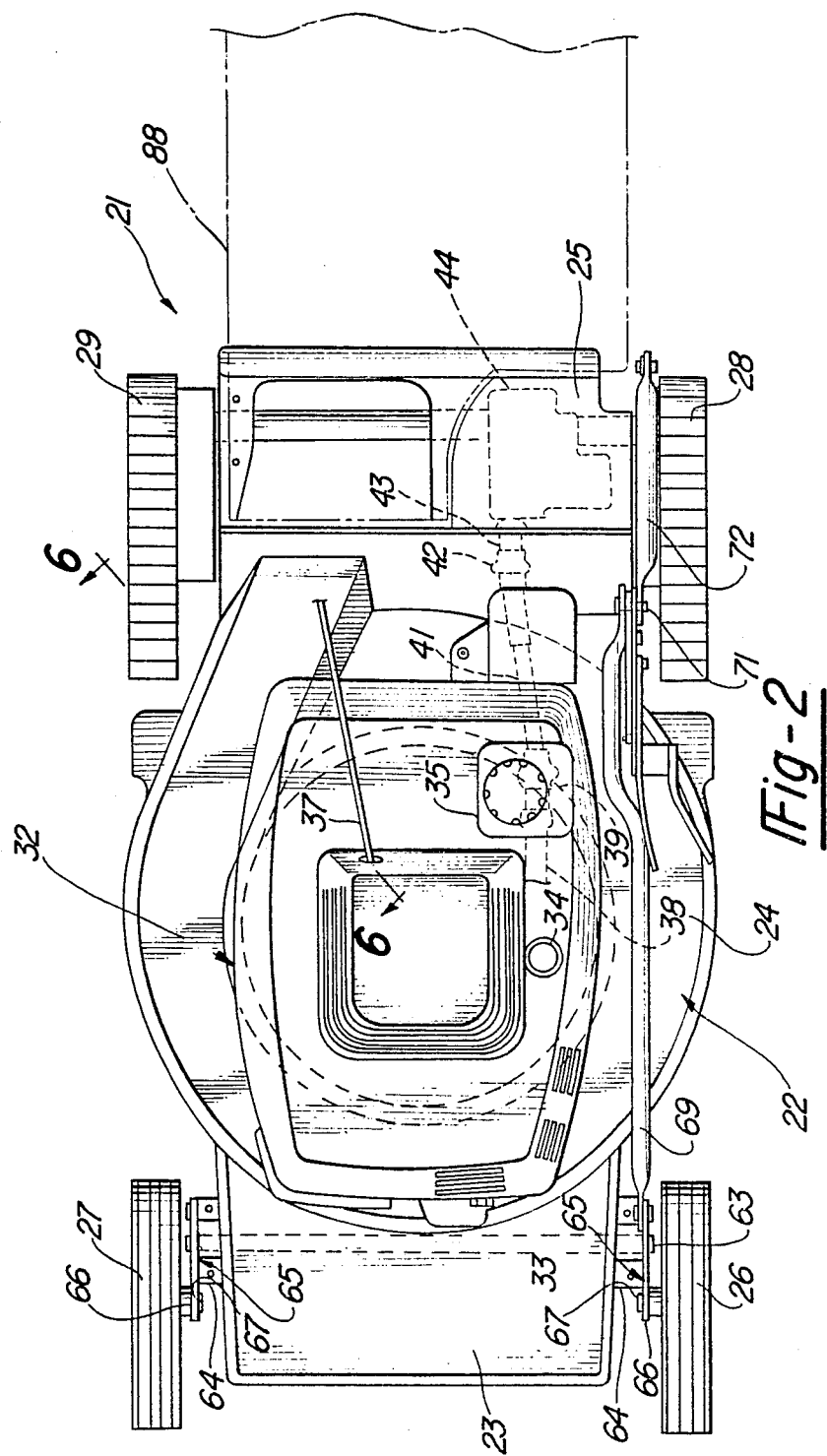
FIG. 2 is a top plan view of the lawn mower.
Figure 3:
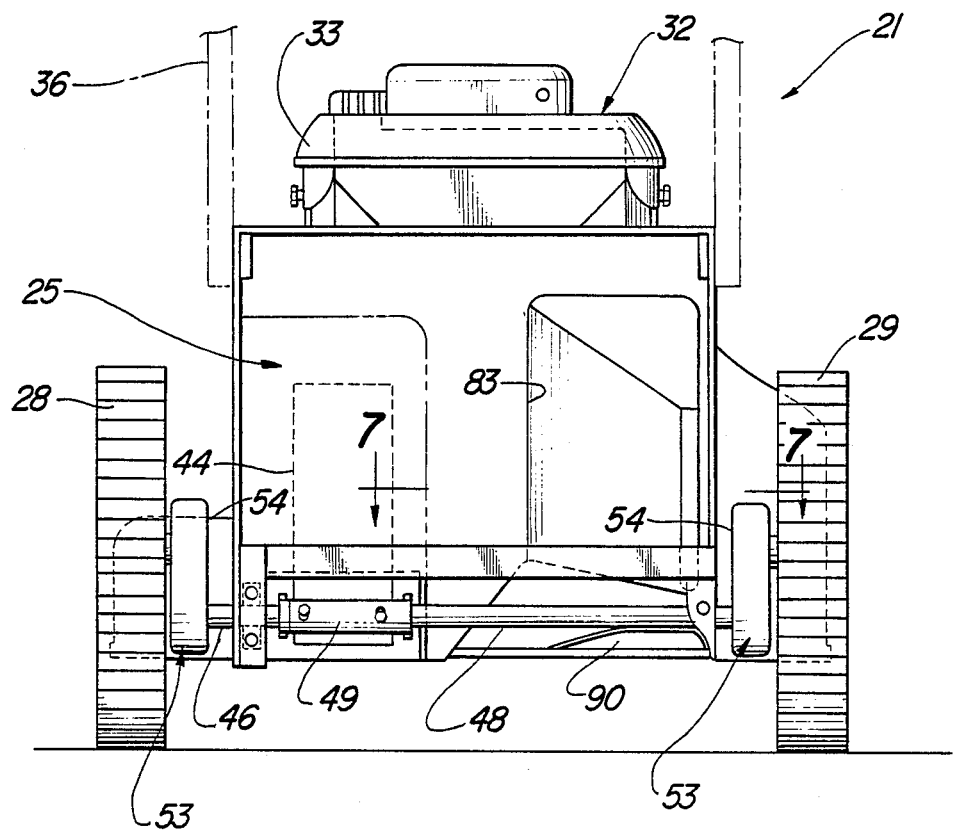
FIG. 3 is a rear elevational view of the lawn mower.

Referring first generally to FIGS. 1 through 3, a walk-behind self-propelled rotary lawn mower constructed in accordance with an embodiment of the invention is identified generally by the reference numeral 21. The lawn mower 21 includes a main body portion, indicated generally by the reference numeral 22 and which maybe formed from a suitable material such as cast aluminum or the like.

The main body portion is comprised generally of a forwardly extending inlet part 23, a main part defining a scroll casing 24 and a discharge or trailing portion 25. The parts 23, 24 and 25 are integrally connected to each other.

The main body portion 22 is supported for movement along the ground by means of a pair of front wheels 26 and 27. The wheels 26 and 27 are supported on the housing 22 in a manner so as to permit adjustment of the rotational axis of the wheels 26 and 27 relative to the housing 22 for cutting height adjustment. In a similar manner, a pair of rear wheels 28 and 29 are carried by the housing part 25 and are adjustable vertically relative to the main body portion 22 so as to permit cutting height adjustment. As will become apparent, the adjusting mechanisms for the wheels 26, 27, 28 and 29 are interconnected so that the height adjustment at all four corners of the outer housing portion 22 will be achieved simultaneously. This insures against accurate adjustment of all wheels and simplifies the operation.

A cutting blade 31 is contained within the scroll part 24 of the main body portion 22 and is rotatable about a vertically extending axis. The manner in which the cutting blade 31 is journaled forms no part of the invention, and for that reason, has not been illustrated in detail. An internal combustion engine, indicated generally by the reference numeral 32 and which may be of any known type is provided for driving the blade 31. To that end, the engine 32 is of the type having its output shaft rotating about a vertically extending axis and the crankshaft or output shaft may be directly connected to the blade 31 for rotation of the blade 31 at the same speed as the engine output shaft.

Although the specific form of the engine 32 forms no part of this invention, it should be noted that the engine 32 is provided with an outer protective cowling 33 which cooperates with its air-cooling system. In addition, the engine 32 has a crankcase with a lubricating system which may be filled through a fill opening 34. Furthermore, a fuel tank 35 is positioned rearwardly of the engine and may be directly carried by it.

A handle 36 of any know type is affixed to the main body portion 22 in a suitable manner and one which may allow adjustment and/or folding of the handle for storage or convenience. A starter rope 37 for the engine 32 extends rearwardly and is supported at the operator end of the handle 36 in a known manner so that the operator can start the motor 32 from his standing position behind the mower.

As has been noted, the mower 21 is of the self-propelled type. To this end, the engine 32 is provided with an auxiliary output shaft 38 which may be driven either directly from the engine output shaft or may be driven from an engine accessory shaft such as the camshaft. In the illustrated embodiment, the auxiliary output shaft 38 rotates about a generally horizontally extending axis. The auxiliary output shaft 38 is coupled by means of a first universal joint 39 to one end of a driveshaft 41. The drive shaft 41 extends generally rearwardly and downwardly and is coupled at its trailing end to the input end of a second universal joint 42. The output of the second universal joint 42 drives an input shaft 43 of a step-down transmission, indicated generally by the reference numeral 44. The step-down transmission 44 (FIG. 4) may be of any known type and drives a rear axle 45 at a reduced speed ratio from the speed of the driveshaft 38. The axle 45 extends transversely across the rear end of the main body portion 22 and is positioned below the discharge chute, as will be described.

Figure 4:
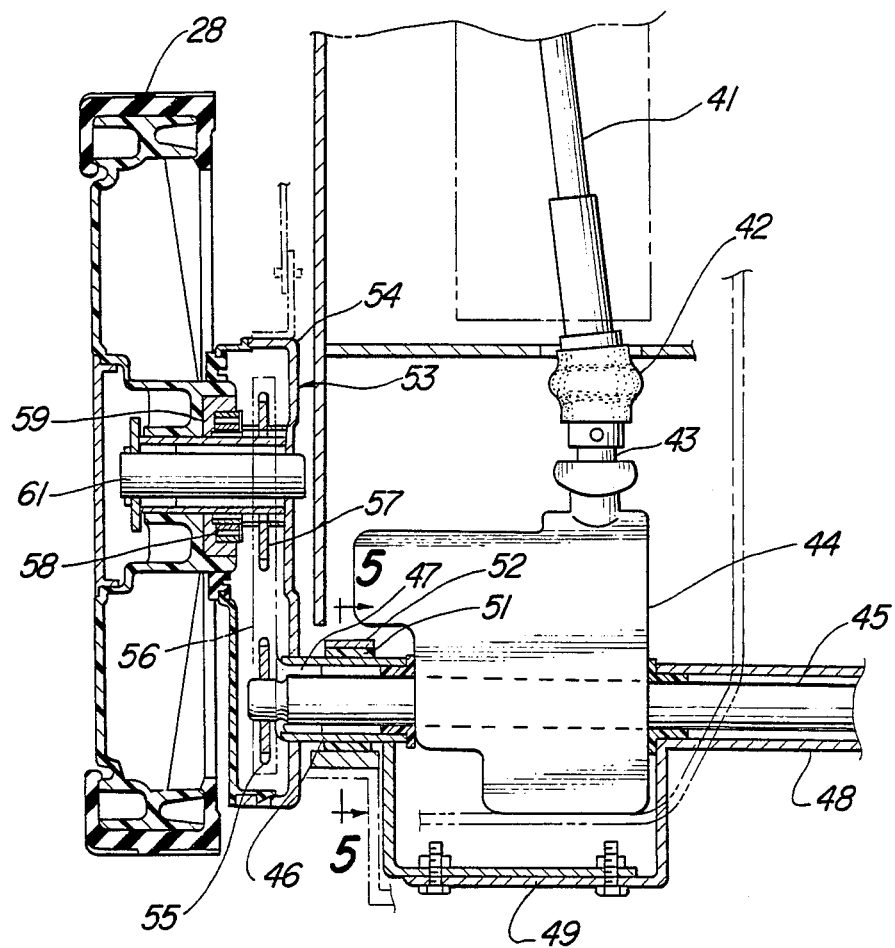
FIG. 4 is an enlarge sectional view taken along the line 4—4 of FIG. 1 and shows the arrangement for driving the rear wheels.
Figure 5:
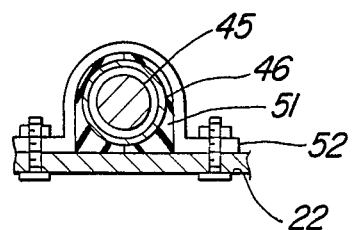
FIG. 5 is a cross-sectional view taken along the line 5—5 of FIG. 4.
Figure 6:
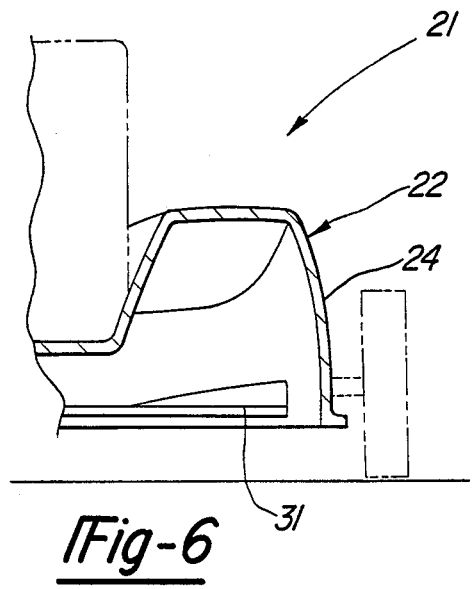
FIG. 6 is a cross-sectional view taken along the line 6—6 of FIG. 2.
Figure 7:
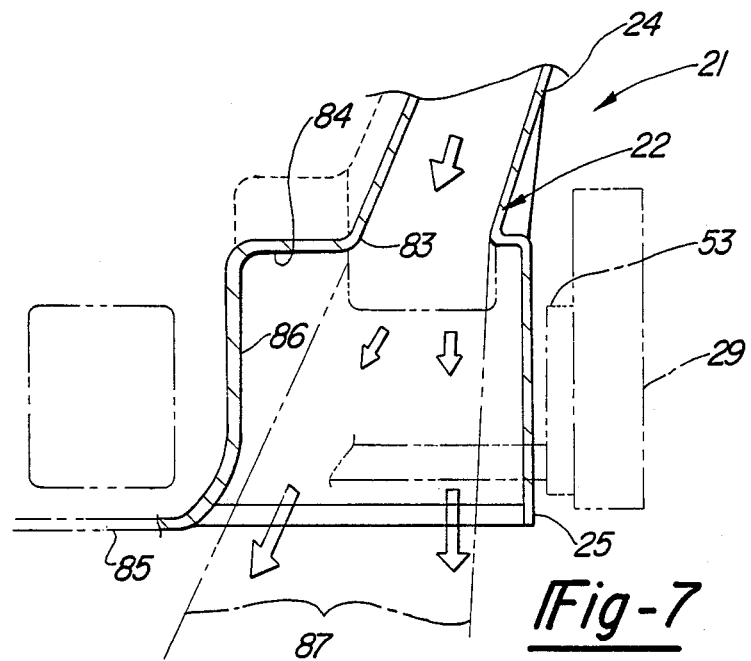
FIG. 7 is a partial cross-sectional view taken along the line 7—7 of FIG. 3.

The rear axle 45 is journaled for rotation about a fixed rotational axis relative to the main body portion 22 by a construction as best understood by reference to FIGS. 4 and 5. It should be noted from FIG. 4 that the transmission 44 is offset to one side of the mower 21, for a reason to be described. This offset places the transmission 44 adjacent the rear wheel 28. There is a tubular shaft 46 that extends between the transmission 44 and toward the rear wheel 28 that carries an outboard bearing 47 so as to journal the adjacent portion of the axle shaft 45 relative to the tube 46. There is a similar longer tube 48 that extends between the opposite side of the transmission 44 and which terminates adjacent the outer remaining rear wheel 29. The other end of the tube 48 carries a similar bearing for supporting the other end of the rear axle 45.

The tubes 46 and 48 are coupled together by means of a bracket assembly 49 for a reason to be described. The tubes 46 and 48 are respectively supported by means of anti-friction bearings 51 carried in brackets 52 that are affixed to the main body portion 22 for rotation of the tubes 46 and 48 about an axis that is coincident with the rotational axis of the rear axle 45.

The rear wheels 28 and 29 are each driven from the respective ends of the rear axle 45 by means of auxiliary transmissions, indicated generally by the reference numeral 53 and having a construction as best shown in FIG. 4. Each of these auxiliary transmissions 53 comprises a transmission casing 54 which may be formed from sheet metal and which is affixed to the respective end of the tubular number 46 or 48. Contained within the auxiliary transmission casing 54 is a sprocket 55 that is affixed tot he respective end of the rear axle 45. A chain 56 is trained around the sprocket 55 and a further sprocket 57 that is connected by means of a one-way clutch 58 to a hub 59 of the respective rear wheel 28 or 29 for driving it. The rear wheel hubs 59 are journaled upon a stub axle shaft 61 that is affixed in any suitable manner to the auxiliary transmission casing 54. The use of the auxiliary transmissions 53 for driving the rear wheels 28 and 29 permits the rear axle 45 to be lowered relative to the rotational axis of the rear wheels 28 and 29 and also permits pivotal adjustment of the auxiliary transmissions 53 relative to the rear axle 45 for height adjustment.

It should be readily apparent that rotation of the auxiliary transmission assemblies 53 relative to the axis of rotation of the rear axle 45 will cause the stub axle 61 to move through an arc relative to the main body portion 22 so as to permit height adjustment. Also, the auxiliary transmissions 53 are interconnected with each other for simultaneous rotation due to the fact that they are affixed to the tubes 46 and 48 respectively and these tubes are rigidly interconnected for simultaneous rotation by means of the brackets 49.

Referring now primarily to FIGS. 1 and 2, the front part 23 of the main body portion 22 is formed with an upwardly opening recess 62 in which a front axle 63 is positioned. The front axle 63 is journaled at opposite ends relative to the body part 23 by means of supporting brackets 64 which are affixed to the body part 23 in a known manner.

Respective bellcranks 65 are affixed to the ends of the front axle 63 and have first arms 66 that carry stub axles 67 which journal the respective front wheels 26 and 27 in suitable manner. The bellcrank 65 at one side of the mower 21 has a further arm 68 that is pivotally connected to one end of a link 69. The link 69 extends rearwardly and is connected at its rearward end by a pivot pin 71 to a rear link 72. The pivot pin 71 is connected to one arm of a bellcrank 73 that is pivotally supported on the main body portion by a pivot pin 75.

The rear end of the link 72 is connected by means of a pivot pin 76 to a lever are 77 that is rigidly connected to the relative auxiliary transmission casing 54. Hence, the linkage system comprised of the links 69 and 72 will transmit motion from the front bellcrank 65 to the rear transmission casing 54 and vice versa so that the wheels at one side of the mower will be operated simultaneously. In addition, the fact that the front bellcranks are rigidly connected to the axle 63 and the transmission casing 54 are rigidly connected to each other by the axle tubes 46, 48 and brackets 49 insures that the wheels at the other side of the mower 21 will be adjusted simultaneously with those connected by the lines 69 and 72.

The bellcrank 73 cooperates with a locking mechanism as shown in FIG. 1 for retaining the wheels 26, 27, 28 and 29 in an adjusted position. This locking mechanism includes a slidable sleeve 78 that is supported on the other bellcrank arm and which carries a locking pin 79. The locking pin 79 is adapted to be received in selected notch 81 of a bracket 82 that is affixed to the main body portion 22. The sleeve 78 is urged by a coil spring (not shown) so that the locking pin 79 moves into engagement with a respective one of the notches 81.

If an operator desires to achieve height adjustment, the sliding handle 78 is moved so that the pin 79 is free of the notches 81 and the bellcrank 73 is then rotated. FIG. 1 shows the mower 21 at maximum cutting height.

If the cutting height is to be lowered, the bellcrank 73 is pivoted in a counterclockwise direction which effects counterclockwise rotation of the front bellcranks 56 and the rear auxiliary transmissions 53 so as to lower the respective stub axles 61 and 67. As a result, the cutting height will be lowered. The mechanism can be re-locked in the set adjusted position by releasing the sliding sleeve 78 whereupon the locking pin 79 will re-enter the appropriate locking notch 81.

Referring now primarily to FIGS. 2 through 4, 6 and 7, the grass discharge chute construction will be described. As has been previously noted, the main body portion 22 has a scroll part 24 in which the cutter blade 31 rotates. The scroll part 24 is configured so as to form a rearwardly opening grass discharge chute 83. As may be seen best in FIG. 7, the discharge chute 83 opens into a transversely extending wall 84 of the main body portion 22. The wall 84 is disposed forwardly of a rear wall 85 of the housing assembly with the walls 84 and 85 being connected by a longitudinally extending wall 86. It should be noted that the longitudinally extending wall 86 lies to one side of the main transmission 44 and is spaced outwardly relative to the opening of the discharge chute 83 so that grass clippings that are thrown rearwardly will follow the path indicated by the broken lines 87 and will not impinge upon either the wall 86 or the transmission 84. As a result, clogging of the discharge chute will be avoided and the transmission will not become clogged with the grass clippings since it is protected from them both by the outer casing of the transmission 44 and by the walls 84 and 86 as well as their relationship to the discharge chute 83 and the path of grass discharge. The discharge chute is also defined at its lower end by a plate 90 that extends upwardly so that the cut grass will be directed upwardly over the tube 48.

A catcher bag 88 may be mounted on the rear of the main body portion 22 in an appropriate manner so as to receive the grass clippings thrown from the discharge chute 83.

Conventionally, rotary mowers employ the forces generated by the cutting blade as a device for causing the grass to move to an erect position so it will be uniformly cut. However, various conditions can prevent the mere suction of the blade from achieving its intended purpose. In accordance with the invention, the forward or inlet part 23 of the main housing portion 22 is configured as shown in FIGS. 8 through 10 so as to achieve a combing or raking function on the grass that will tend to cause it to move to an erect position and to insure that the suction of the blades can lift the grass into an erect position for cutting. As may be best seen in FIG. 8 through 10, the inlet part 23 has a generally boxed shape that is defined at its rear end by a depending wall 89 of the scroll portion 24. This depending wall has a serrated lower edge 91 that will act at as a comb or rake so as to remove foreign particles from the grass and also to comb or rake the grass upwardly so as to facilitate cutting. It has been found that this construction will give a much more satisfactory and uniform cut heighth.

It should be readily apparent from the foregoing description that the described mower is extremely effective in providing a good grass cut, ease of adjustment and operates in such a way that the discharge chute, even though rearwardly facing is not obstructed by the rear axle of the mower regardless of the height. Although an embodiment of the invention has been illustrated and described, various changes and modifications may be made without departing from the spirit and scope of the invention, as defined by the appended claims.

What is claimed is:

1. A rotary walk-behind lawn mower having an outer housing, a rotating cutting blade contained within said outer housing and rotatable about a generally vertically extending axis, a power unit carried by said outer housing for driving said cutting blade, said outer housing defining a discharge chute through which grass cut by said cutting blade is discharged, a plurality of wheels journaled relative to said outer housing, an axle, a pair of chain drive transmissions for rotatably coupling two of said wheels to said axle, said axle being journaled by said outer housing and extending across and beneath said discharge chute, and means for driving said axle from said power unit, each of said chain drive transmissions being contained within a respective housing which is pivotal about the axis of said axle for changing the cutting height of the lawn mower.

2. A rotary walk-behind lawn mower as set forth in claim 1 further including means for interconnecting the chain drive transmission housings for simultaneously pivotal movement.

3. A rotary walk-behind lawn mower as set forth in claim 2 wherein the discharge chute opens rearwardly and is defined by a wall of the outer housing, the axle comprising a rear axle and the wheels rotatably coupled to said rear axle comprising the rear wheels of said mower, there being a transmission for driving said rear axle from said power unit positioned on the side of a wall away from said discharge chute.

4. A rotary walk-behind lawn mower having an outer housing, a rotating cutting blade contained within said outer housing, and rotatable about a generally vertically extending axis, a power unit carried by said outer housing for driving said cutting blade, said outer housing defining a discharge chute through which grass cut by said cutting blade is discharged, a plurality of wheels journaled relative to said outer housing, an axle, means for driving said axle from said engine, and first and second transmission means for driving a first and second of said wheels form respective ends of said axle, said first and said second transmission means being pivotal about said axle for adjusting the height of said outer housing relative to said first and said second wheels.

5. A rotary walk-behind lawn mower as set forth in claim 4 wherein said first and said second transmission means comprise chain transmissions.

6. A rotary walk-behind lawn mower as set forth in claim 4 wherein the first and second transmission means comprises an outer housing pivotal about the axle and journaling the first and second wheels respectively.

7. A rotary walk-behind lawn mower as set forth in claim 6 wherein the first and second wheels are journaled by stub axles fixed relative to the respective transmission housings.

8. A rotary walk-behind lawn mower as set forth in claim 7 wherein said first and said second transmission means comprise chain transmissions.

9. A rotary walk-behind lawn mower as set forth in claim 4 wherein the first and second transmission means are interconnected for simultaneous pivotal movement whereby pivotal movement one of said transmission means effects pivotal movement of the other of said transmission means.

10. A rotary walk-behind lawn mower as set forth in claim 9 further including means for adjusting the height of the remaining wheels simultaneous with pivotal movement of the first and second transmission means.

11. A rotary walk-behind lawn mower as set forth in claim 4 wherein the discharge chute extends above one side of the axle.

12. A rotary walk-behind lawn mower as set forth in claim 11 further including main transmission means for driving the axle from the engine and wherein the outer housing defines a dividing wall extending between said main transmission means and said discharge chute.

* * * * *